United States Patent [19]
Brown et al.

[11] Patent Number: 5,517,680
[45] Date of Patent: May 14, 1996

[54] SELF CORRECTION OF PST SIMULCAST SYSTEM TIMING

[75] Inventors: Thomas A. Brown; George D. Rose, Jr., both of Lynchburg, Va.

[73] Assignee: Ericsson Inc., Lynchburg, Va.

[21] Appl. No.: 824,123

[22] Filed: Jan. 22, 1992

[51] Int. Cl.⁶ .................................................. H04B 7/005
[52] U.S. Cl. ........................ 455/51.2; 455/56.1; 375/357
[58] Field of Search .................................. 455/49.1, 51.1,
    455/51.2, 57.1, 67.1, 8–9, 10, 56.1, 13.2,
    52.1, 52.3; 375/106, 107, 108, 8, 3.1, 354,
    356, 357, 359; 370/100.1, 103

[56] References Cited

U.S. PATENT DOCUMENTS

| 3,902,161 | 8/1975 | Kiowski et al. . |
| 4,218,654 | 8/1980 | Ogawa et al. . |
| 4,255,814 | 3/1981 | Osborn . |
| 4,317,220 | 2/1982 | Martin . |
| 4,411,007 | 10/1983 | Rodman et al. . |
| 4,414,661 | 11/1983 | Karlstrom . |
| 4,472,802 | 9/1984 | Pin et al. . |
| 4,475,246 | 10/1984 | Batlivala et al. . |
| 4,516,269 | 5/1985 | Krinock . |
| 4,525,861 | 6/1985 | Freeburg . |
| 4,570,265 | 2/1986 | Thro . |
| 4,578,815 | 3/1986 | Persinotti . |
| 4,597,105 | 6/1986 | Freeburg . |
| 4,608,699 | 8/1986 | Batlivala et al. . |
| 4,696,051 | 9/1987 | Breeden . |
| 4,696,052 | 9/1987 | Breeden ............................ 455/51.2 |
| 4,718,109 | 1/1988 | Breeden et al. . |
| 4,782,499 | 11/1988 | Clendening ....................... 375/107 |
| 4,835,731 | 5/1989 | Nazarenko . |
| 4,850,032 | 7/1989 | Freeburg ........................... 455/51.2 |
| 4,903,262 | 2/1990 | Dissosway et al. . |
| 4,903,321 | 2/1990 | Hall et al. . |
| 4,905,302 | 2/1990 | Childress . |
| 4,918,437 | 4/1990 | Jasinski et al. . |
| 4,926,496 | 5/1990 | Cole et al. . |
| 4,939,746 | 7/1990 | Childress . |
| 4,968,966 | 11/1990 | Jasinski et al. . |
| 4,972,410 | 11/1990 | Cohen et al. . |
| 5,003,617 | 3/1991 | Epsom et al. . |
| 5,014,344 | 5/1991 | Goldberg . |
| 5,046,128 | 9/1991 | Bennett . |
| 5,052,028 | 9/1991 | Zwack .............................. 455/51.1 |
| 5,105,439 | 4/1992 | Bennett et al. . |
| 5,127,101 | 6/1992 | Rose, Jr. . |
| 5,172,396 | 12/1992 | Rose, Jr. et al. ................. 455/51.2 |
| 5,261,118 | 11/1993 | Vanderspool, II et al. ........ 455/51.2 |

OTHER PUBLICATIONS

Hattori et al, "A New Modulation Scheme for Multitransmitter Simulcast Digital Mobile Radio Communication", Electrical Comm. Labs., Nippon Tel. & Tel. Public Corp., Japan, Paper, pp. 83–88, (1979).
Japanese Patent Disclosure No. 61-107826.

Primary Examiner—Reinhard J. Eisenzopf
Assistant Examiner—Nguyen Vo
Attorney, Agent, or Firm—Nixon & Vanderhye

[57] ABSTRACT

Arrangements are disclosed for maintaining time synchronization of simulcast radio frequency communications system transmissions. A circuit continually instructs a modem to use the common system clocking signal, and modems are retrained whenever a channel is taken out of service because of a test call failure.

11 Claims, 3 Drawing Sheets 5,517,680

1

SELF CORRECTION OF PST SIMULCAST SYSTEM TIMING

CROSS-REFERENCE TO RELATED APPLICATIONS AND PATENTS

This application is related to copending commonly-assigned application Ser. No. 07/260,184 of Rose et al filed 20 Oct. 1988 entitled "Public Service Trunking Simulcast System," which issued on Dec. 15, 1992 as U.S. Pat. No. 5,172,396. This application is also related to commonly-assigned U.S. Pat. No. 4,903,321 to Hall et al. The disclosure of each of these two patents is incorporated by reference as if expressly set forth herein.

FIELD OF THE INVENTION

This invention relates to radio frequency (RF) signal transmission systems, and in particular to "simulcasting" systems for providing the simultaneous transmission of the same information by two or more separately located RF transmitters. More particularly, the invention relates to the self correction of simulcast system timing, and still more particularly to such self correction of system timing at one or more remote transmitting site(s) to increase reliability even in view of intersite communication path (e.g., microwave link) failures resulting from power outages, fades and various "noise hits" or the like.

BACKGROUND AND SUMMARY OF THE INVENTION

Radio repeater trunking (i.e., time sharing of a single repeater communications channel among many users) is well known. Although there are many actual potential applications for trunked radio repeater systems, one of the more important applications is for public service trunked (PST) systems. An exemplary PST system is discussed in commonly-assigned U.S. Pat. No. 4,905,302 to Childress et al entitled "Trunked Radio Repeater System," which is incorporated by reference herein.

As is well known, it may not be possible for a single RF repeater transmitting site to satisfactorily serve a geographically large coverage area. Accordingly, systems which must provide RF communications for an entire large geographical area (e.g., a major metropolitan area, a large county, etc.) typically include multiple RF transmissions sites. FIG. 1 is a schematic diagram of a simplified multiple-site "simulcast" system having three radio repeater (transmitting) sites S1, S2 and S3 for providing simulcast communications to geographical coverage areas A1, A2 and A3, respectively. A control point or "hub" C (e.g., a dispatch center) provides identical signals to each of sites S1 through S3 via links L1 through L3, respectively. These links are typically microwave links. Each site S1–S3 transmits the signals it receives from the control point C to its respective coverage area A, so that a mobile or portable transceiver receives the same signal no matter where it happens to be in the communications system overall coverage area A (which constitutes the "union", in an analogy to venn diagrams of the individual coverage areas A1, A2 and A3). In a simulcast system, the various transmitting sites transmit substantially the same signals substantially simultaneously at substantially the same radio frequency to avoid interference while increasing overall coverage areas.

Mobile or portable transceivers within area A1 can receive the signals transmitted by site S1, transceivers within area A2 can receive the signals transmitted by site S2,

2 and transceivers within area A3 can receive signals by site S3. Transceivers moving out of a first site coverage area and into a second sites area cease monitoring the signals transmitted by the first site and begin monitoring the signals transmitted by the second site such that communication is continuously maintained without interruption so long as the transceiver stays within the overall combined system coverage area A'. An exemplary public service trunking simulcast system of this sort is disclosed in greater detail in commonly-assigned copending U.S. patent application Ser. No. 07/260,184 filed Oct. 20, 1988 entitled "Public Service Trunking Simulcast System" to Rose, Jr., and has been successfully in public use for quite some time.

Simulcasting in a multiple-site RF transmission is thus generally known. The following list (which is by no means exhaustive) of prior issued patents describe various aspects of RF transmission simulcasting and related PST issues:
U.S. Pat. No. 4,696,052 to Breeden;
U.S. Pat. No. 4,696,051 to Breeden;
U.S. Pat. No. 4,570,265 to Thro;
U.S. Pat. No. 4,516,269 to Krinock;
U.S. Pat. No. 4,475,246 to Batlivala et al;
U.S. Pat. No. 4,317,220 to Martin;
U.S. Pat. No. 4,972,410 to Cohen et al;
U.S. Pat. No. 4,903,321 to Hall et al;
U.S. Pat. No. 4,608,699 to Batlivala et al;
U.S. Pat. No. 4,918,437 to Jasinski et al;
U.S. Pat. No. 4,578,815 to Persinotti;
U.S. Pat. No. 5,003,617 to Epsom et al;
U.S. Pat. No. 4,939,746 to Childress;
U.S. Pat. No. 4,903,262 to Dissosway et al;
U.S. Pat. No. 4,926,496 to to Cole et al;
U.S. Pat. No. 4,968,966 to Jasinski et al;
U.S. Pat. No. 3,902,161 to Kiowski et al;
U.S. Pat. No. 4,218,654 to Ogawa et al;
U.S. Pat. No. 4,255,814 to Osborn;
U.S. Pat. No. 4,411,007 to Rodman et al;
U.S. Pat. No. 4,414,661 to Karlstrom;
U.S. Pat. No. 4,472,802 to Pin et al;
U.S. Pat. No. 4,597,105 to Freeburg; and,
Japanese Patent Disclosure No. 61-107826.

U.S. Pat. No. 4,903,321 to Hall et al, issued Feb. 20, 1990, entitled "Radio Trunking Fault Detection System," discloses a trunked radio repeater system having a radio frequency repeater site architecture that includes fault and call testing and failure detection features that are relevant to the presently preferred exemplary embodiment of the present invention. This patent is assigned to the assignee of the present invention and is incorporated by reference herein.

The present invention is directed toward improvements in a PST simulcast RF transmission system. In particular, the present invention is directed toward a method and apparatus for self correction of simulcast system timing. Specifically, in a PST simulcast system, the need for maintaining correct digital timing is extremely important since data timing is a very critical parameter in maintaining system performance. The communication paths (typically microwave links) between sites are subject momentary fades or "hits" on a somewhat unpredictable basis. Such fades or hits can cause equipment at the transmitting sites (e.g., modems) to lose synchronization with a common distributed system clocking signal—thereby destroying the time synchronicity critical to "simulcast" operation.

In general, maintaining data capability on the PST simulcast (in accordance with the above-mentioned copending Rose application) requires precise timing control. As such, the PST simulcast system described in accordance with the above-mentioned copending Rose patent application forces coherence at the start of data transmission on a particular established communications path, thus correcting for any multibit ambiguity created by the communication path modem. However, any "hit" or outage affecting a particular data path and its associated modems may cause the timing to be reestablished at a "random" latency. Since the timing and location of these "hits" is not predictable and, moreover, may occur remotely from the control point, it is not always practical to detect the timing fault, relay this information back to the control point, and then initiate effective action. In particular, there are three "hit" scenarios which must be handled: 1) a hit on a data communication path which causes a normal retrain of its associated modem using the data stream; 2) a hit on a data communication path which causes retrain of its associated modem using the data stream, before the data link is fully stable (which can result in abnormal latency); and 3) a hit on power "glitches" at a particular modem, causing it to default to its internal clock, rather than using the supplied external system clock.

Since data capability on the PST simulcast system requires precise timing control, the typical multiple bit ambiguity created by the modem must be corrected in order to provide proper system operation.

One approach to solving problems relating to a "type 1" hit (which approach has been in use in EGE systems since 1989) is to periodically reestablish the data timing assuming "normal" path conditions, on the working channels and on the control channels, in a manner which is transparent to the users and which provides preservation of interchannel timing as well. Resynchronization on a working channel may take place on a "per call" basis and resynchronization on the control channel may be implemented in a periodic (e.g., 54 second intervals) fashion.

More specifically, in its "idle" state, a preferred embodiment working channel (WC) station tristates a drive. As a resync will be initiated by a transmission of "1s" for more than 9 ms, by forcing the data line high during this tri state mode a resync can be initiated. Since this data drive is also tristated during the voice portion of a voice call, a resync will also be initiated there. This will effectively force coherence on (a) the first bit of every call (all calls begin with a digital message), and (b) the first bit of the channel drop message at the end of each call. If the channel gets reassigned before the entire channel sequence completes, the system changes the data context to reflect the channel coming backup. This is transferred to the resync action, and coherence, which was at the start of the drop is continued for the duration of the "channel coming up" message.

Considering a type 2 hit:

(a) The 600 Hz sync tone can be reduced to 300 Hz, effectively doubling the available range that can be corrected. (With an equalized channel, it is possible to go lower; or with analog FSK modems and voice channel, e.g., sampling jitter on "digital implemented" Bell 201 modem, makes them unacceptable.);

(b) The range of latency variation may be as much as 5 ms to 16 ms. A tone reference of approximately 50 Hz would be needed to cover this. (If 30 Hz was chosen, the FSL could be used directly and recover some errors completely.) (However, lowering the reference tone requires bigger FIFOs and also creates system latency.);

(c) A type 2 hit or event can be "fixed" by retraining the modem again once the communication path link is stable. This is analogous to resyncing for a type 1 hit, except that the retraining process is both longer and potentially more disruptive. Because a channel may be reassigned at any time, it is not feasible to retrain a modem following a test call. The only "benign" time for such an activity would be during a voice call. This requires that the "voice" time be at least 80 ms long to handle the channel drop message properly. (The control channel problem is more severe, as the length of retrain will not allow frame sync maintenance by the radios.)

Given that a type 2 event is rare, there is an alternative which is less disruptive. The preferred embodiment PST system has a test system (as described in the above-cited Hall et al patent) which periodically makes test calls to verify proper operation on each channel. As a type 2 hit will cause a test call failure (e.g., high speed data confirmation failure), the test call results can be used to initiate a modem retrain. The test call failure gets reported back to the channel "control" trunking card as an "inhibit" signal (e.g., through the alarm system). Since this inhibit signal already takes the channel out of service, the modem retrain is not disruptive. The TUAI ("test unit alarm interface") takes the test "call results" message and determines which channel to "take out of service" (all as described in the above-referenced Hall patent). The modems associated with the down channel may then be retrained (i.e., untrained and then retrained) without any disruptive effect on over-the-air signalling.

A type 3 hit can be handled by periodically instructing the modem to use its external (i.e., distributed common system) clock. This action is transparent, having no disruptive effect on modem operation. Because the timing errors result from the frequency difference in the two clocks (i.e., between the modem internal clock and the external system clock) a single extra or lost bit will typically occur every seven or eight seconds while using the internal clock. An acceptable "use external clock" instruction "kicking" rate was thus chosen to be approximately every thirty seconds (i.e., the modem is instructed by the kicker circuit to use the external clock at least every thirty seconds).

Thus, in accordance with one feature provided by the present invention, communication paths are restored to a "normal" state if they become "abnormal," thus allowing standard data timing to be reestablished. A "retraining" of the data modems used in the communications path is initiated upon the detection of a channel inhibit signal resulting from a test call failure. A channel inhibit signal is automatically generated in the preferred embodiment for a working channel from a "test" call (as discussed in the above mentioned commonly assigned Hall et al U.S. Pat. No. 4,903, 321), which fails if the path timing is abnormal. More particularly, the preferred embodiment periodically checks proper transmitting station operation by making "test calls." Such test calls can fail due to improper system timing— thereby automatically taking the failed station out of service. In the preferred embodiment, modems for the failed station/ channel are untrained and then retrained when the channel is so inhibited (thereby curing the problem if the problem resulted from the transmitting site modem losing synchronization with the central point modem). This approach is also transparent to the users (since the channel is inhibited anyway) and will quickly restore a communication data path to a "normal" timing state.

In accordance with another feature of the preferred exemplary embodiment of the present invention, data path modems are automatically restored to synchronization with the external distributed system clock in the event an aberration (e.g., a power glitch, outage, etc.) caused a modem to default to its own internal clock. To restore a communication path data modem back to using the external system clock, in accordance with a preferred embodiment of the present invention, a "kicker" circuit is provided to repetitively instruct the data modem to use the external clock. This approach quickly catches and restores proper operation regardless of what caused the modem to revert to its internal clock operation by default.

Thus, the present invention provides a means to protect against continuing system disruption following such events. The present invention also provides new and useful techniques and arrangements for reestablishing data timing to preserve system performance without disrupting normal system operation.

BRIEF DESCRIPTION OF THE DRAWINGS

These and other features and advantages of the present invention will be better and more completely understood by referring to the following detailed description of presently preferred exemplary embodiments in conjunction with the sheets of drawings, of which:

FIG. 1 is a schematic diagram of a presently preferred exemplary simplified multisite RF communication simulcast system of the type the present invention may be particularly suited for operation with;

DETAILED DESCRIPTION OF PRESENTLY PREFERRED EXEMPLARY EMBODIMENTS

Figure 1:
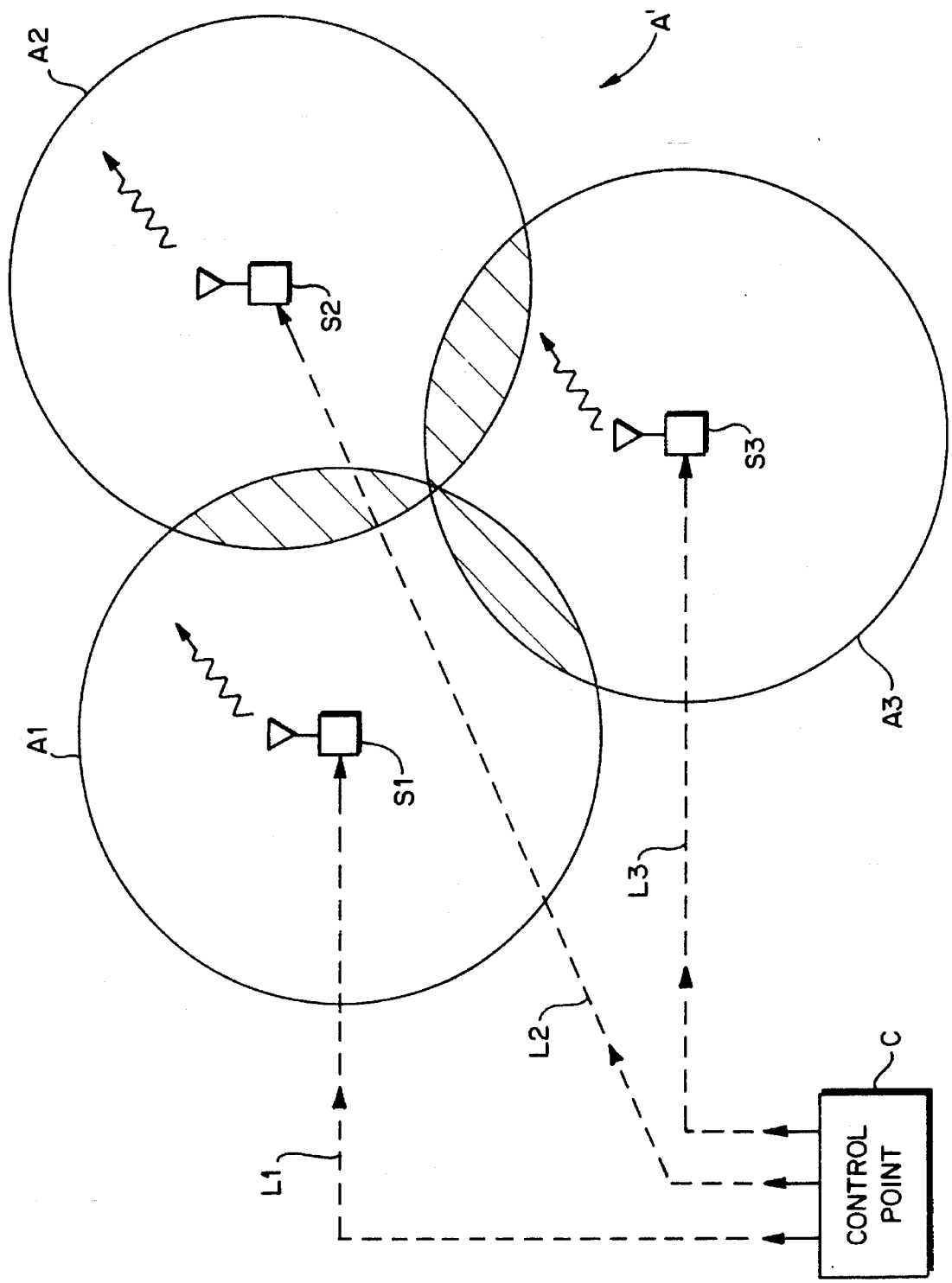
Figure 2:
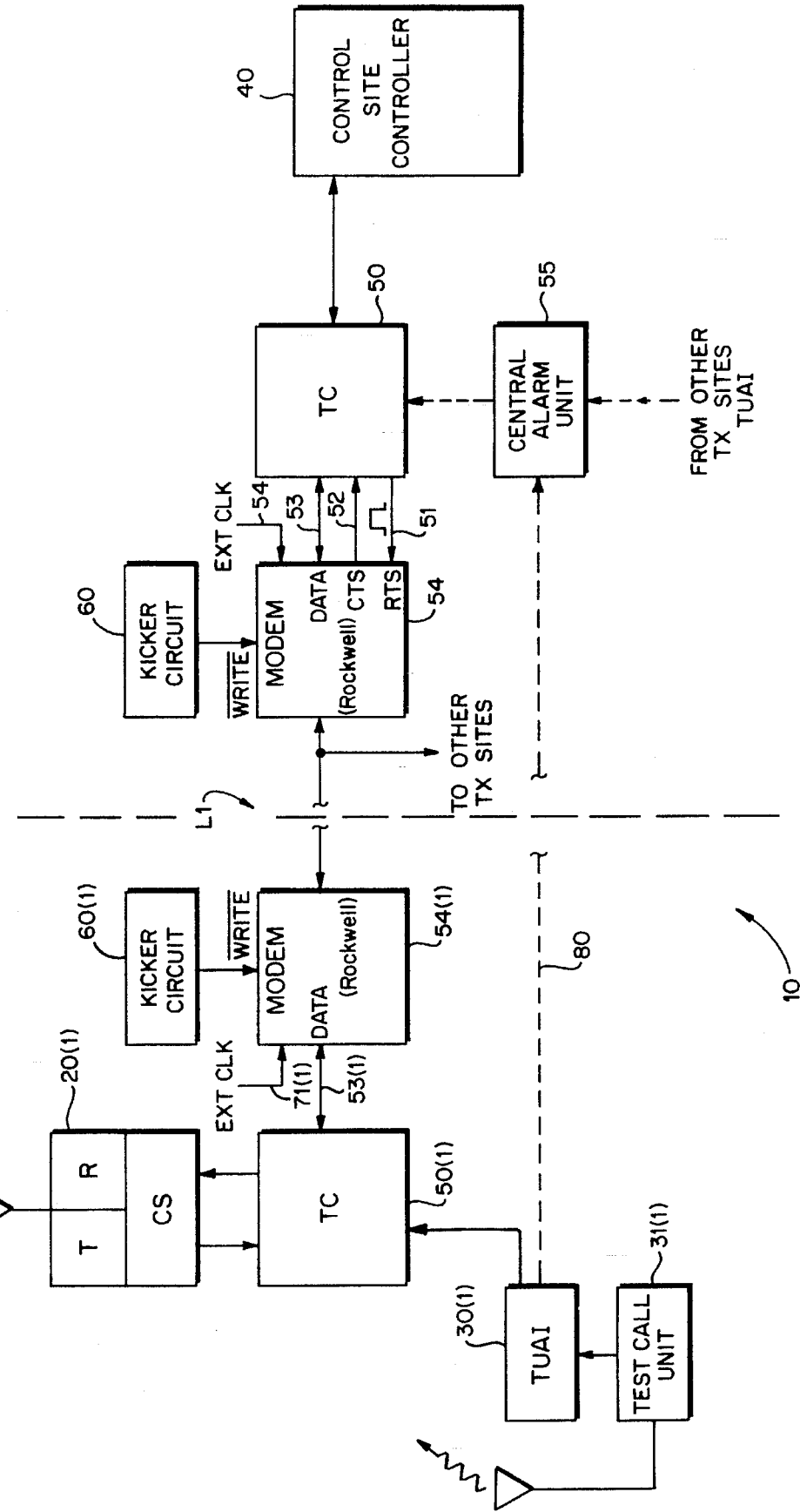
FIG. 2 is a more detailed schematic block diagram of a coherent digital data transmission/simulcasting system in accordance with the presently preferred exemplary embodiment of the present invention.

FIG. 2 is an overall block diagram of the presently preferred exemplary embodiment of a "simulcast" digital RF communications system 10 in accordance with the presently preferred exemplary embodiment of the present invention. System 10 has the overall architecture as is shown in FIG. 1— that is, it includes a central control point C and plural transmitting sites S (only one transmitting site S1 is shown in FIG. 2, although it will be understood that more than one transmitting sites are provided). Control site C includes a transmit data modem 54 (e.g., a conventional 9600 baud type multilevel, multiphase CCITT telephone type modem such as the Rockwell model no. 96FT). The resulting output data stream provided by modem 54 is applied in the preferred embodiment to a conventional type T-1 time-division-multiplex (TDM) digital telephone network and may be distributed to transmitting sites S1, S2, SN via data grade channels D1 of a conventional microwave link L1. While such microwave link is highly reliable, it may be subject to some fading or other "hits" as described above.

Site S1 includes a conventional 9600 baud data receive modem 54(1) connected to the data channel D1. Modem 54(1) decodes the multiphase, multilevel 9600 baud data stream sent to it by a control point transmit modem 54 via link L1. Receive data modem 54(1) at remote site S2 has an external clock signal input that is connected to an external system clock provided for this channel (as described in the above-referenced Rose patent application). Receive data modem 54(1) provides a decoded 9600 baud data stream at its data output and also provides recovered 9600 Hz clocking information derived from and corresponding to a received data stream. The data stream provided at the output of remote site receive modem 54(1) corresponds to the data stream applied to the input of control point transmit modem 54, and the timing of this output stream is controlled (under normal conditions) by the distributed system clock timing. This data output is applied to station transceiver 20(1) for transmission over a radio frequency carrier. The timing of the RF transmission is thus determined by the timing of the data output of modem 54(1).

In the preferred embodiment control point C further includes a modem kicker circuit 60 for repetitively instructing the data modem 54 to use an external system clock explicitly provided for that channel, as explained in greater detail below. Such a "kicker" circuit 60(1) may also be provided to modem 54(1) at remote site S1 if desired.

FIG. 2 depicts an exemplary preferred embodiment of a PST simulcast system that includes improvements for accomplishing self correction of system timing errors. As illustrated in FIG. 2, control point C communicates with remote site S1 via a standard T-1 microwave telecommunications link L1. Although only a single remote site is shown in FIG. 2, it will be appreciated by one skilled in the art that numerous remote sites participating in simulcasting are likewise in communication with control point C via identical T-1 microwave communication path links. Moreover, this invention is not limited to use solely with a T-1 microwave link but may be used with any other type of appropriate communication link.

At control point site C, a site controller 40 communicates and coordinates activity of more or more trunking control processors. Trunking control processor (TC) 50 provides data and control signals via lines 51–53 to modem 54 for controlling communication over link L1. Similarly, remote site S1 is provided with a modem 54(1) for communicating data over link L1. Remote site S1 is also provided with a test alarm and test unit interface unit (TUAI) 30(1). Testing and alarm unit 30(1) monitors tests initiated by test call unit 31(1) (see copending Rose et al patent application mentioned above) and provides status information on the condition and operability of all channels at remote site S1. In addition, modem 54(1) at each remote site is provided with a kicker circuit 60(1) that functions to periodically (e.g., every 30 seconds) instruct modem 54(1) to utilize an external clock signal provided for the channel on line 71(1) instead of its own internal clock signal. Thus, in the instance of a type 3 hit or power glitch occurring at remote site S1, modem 54(1) will be prevented from defaulting to the use of its own internal clock signal by kicker circuity 60(1). Likewise, a similar kicker circuit 60 is provided for modem 54 at control point C. The modem kicker circuit 60 at control point C is the preferred embodiment (the kicker circuit 60(1) at site S1 being optional). The operation of kicker circuits 60, 60(1) is discussed in detail below with respect to FIG. 3.

Referring again to remote site 1, if TUAI 30(1) detects an event or fault condition on a particular channel it informs the TC 50 at control site C, via an alternate standard data path 80. Central Alarm Unit (CAU) 55 collects alarm and test information from other Tx sites TUAI and passes it on to TC 50.

TUAI 30 provides information via an alternate communications path 80 (which may utilize the same microwave link L2 or other suitable communication links) to control point C trunking controller 50 relating to the particular channel for which a channel fault was detected (as described in the above-identified Hall et al patent). In response, TC 50 issues a "retrain" command to control point modem 54. Modem 54 will then send a series of timing pulses over communication link L1 which will be used to retrain remote site S1 modem 54(1) (as well as any and all other Tx site modems connected to modem 54(1) via other communication links).

Retraining of this modem path from a modem 54 is accomplished by TC 50 raising and lowering the signal potential on the request to send input of modem 54 via line 51. A raising of the potential at the RTS input of modem 54 untrains the modem and stops the sending of data from the modem. A subsequent lowering of potential at the RST input causes modem 54 to begin transmitting/sending again. Meanwhile TC 50 is controlled to send modem 54 a series of "retraining" timing pulses (i.e., 1s and 0s) at its output to retrain the modem. Following the retrain sequence, modem 54 subsequently provides a clear-to-send (CTS) indication signals to TC 50 via line 52.

Figure 3:
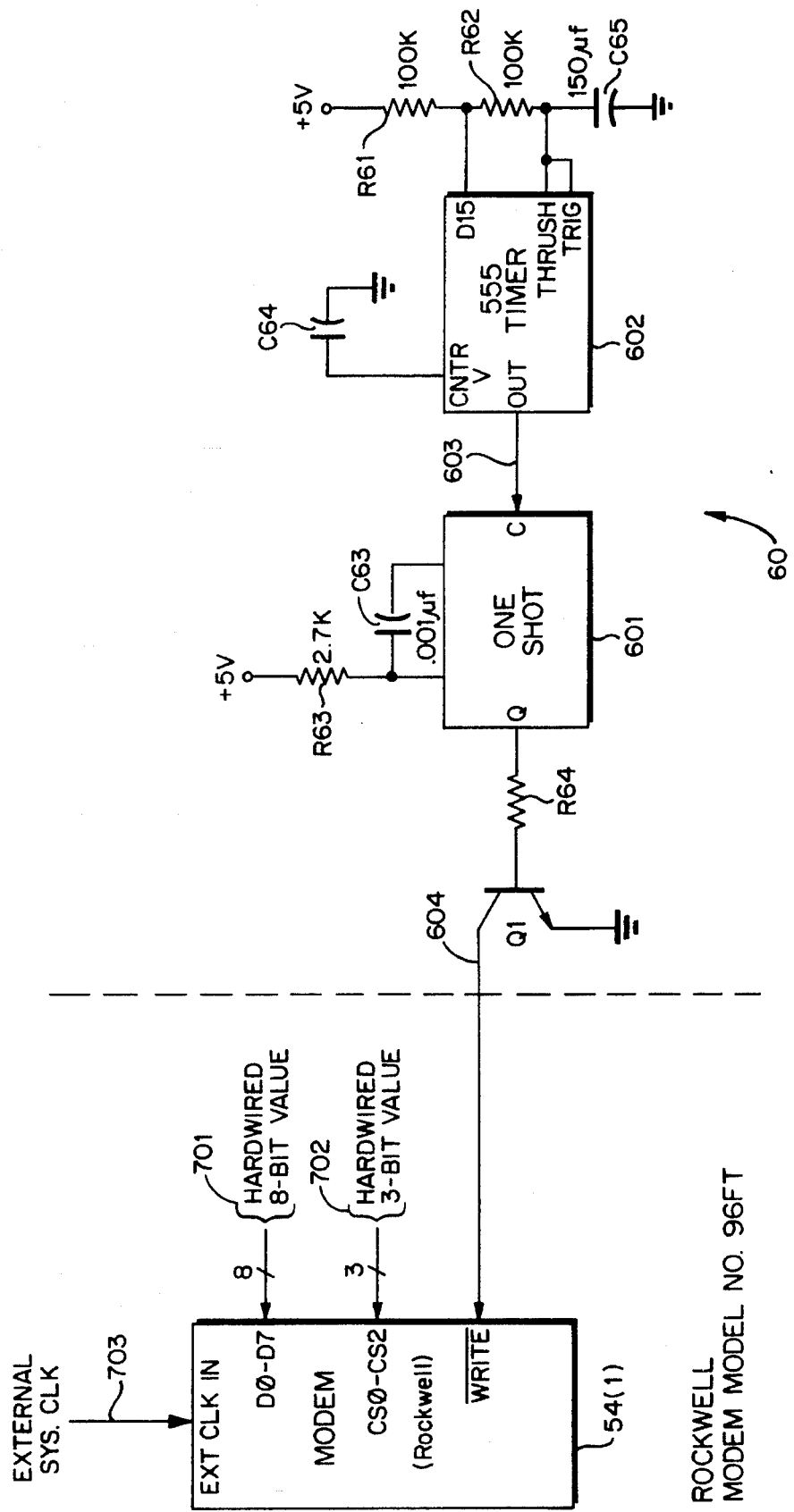
FIG. 3 is a more detailed schematic block diagram of the modem "kicker" circuit arrangement located at the control point of the system shown in FIG. 2.

FIG. 3 depicts an exemplary modem kicker circuit 60 in accordance with the preferred embodiment of the present invention as shown in FIG. 2. In a preferred exemplary embodiment of the simulcast system, the modems at each remote site and at control point C are Rockwell model no. 96FT. This particular type of modem is equipped with an external clock input, data input lines D0–D7, control register selection lines CS0–CS2 and a write to control register input. When a pulse is supplied to the control register write input of modem 54(1) the value on data lines D0–D7 is input into an internal control register selected by the value on the CS0–CS2 inputs. In the preferred embodiment, inputs D0–D7 and CS0–CS2 are hardwired (701, 702) with the appropriate digital values so as to instruct modem 54(1) to utilize an external clock signal provided on its external clock input via line 703 (i.e., the EXT CLK IN input) instead of relying on its own internally generated clock signal. Thus, this hardwired instruction will be forced on the modem 54(1), whenever write input line 703 is pulsed.

Modem kicker circuit 60 utilizes a 555 timer 602 in conjunction with a conventional one shot 601 to provide a continuously repeating pulse of an appropriate duration (e.g., 2.7 microseconds) on modem write line 604. This causes the hardwired instruction 701 to be repeatedly read into the appropriate control registers and, thus, continuously forcing the modem to utilize the externally provided clock signal. Duration of this pulse is determined in the known conventional manner by choosing appropriate values for resistor R63 and capacitor C63 connected to the one shot timing inputs (for example: R63=2.7K and C63=0.001 μf). Likewise, the frequency of pulse generation is determined by 555 timer 602 in a conventional manner by appropriate selection of resistor values R61 and R62 and capacitor value C65 (for example: R61=R62=100K and C65=150 μf). In the preferred embodiment of the present invention, values for resistors R61, R62 and capacitor C65 are chosen such that the frequency of output pulses occurring on write line 604 is at least one pulse every thirty seconds.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a radio frequency communications system having plural spatially separated RF transmitters all transmitting substantially the same signal at substantially the same radio frequency, said system providing a common clocking signal distributed to each of said plural transmitters so as to facilitate a substantially simultaneous signal transmission by said plural transmitters, each of said plural RF transmitters including:

a first circuit arrangement, which determines, at least in part, transmission timing for producing said substantially simultaneous signal transmission, said first circuit arrangement including a modem, wherein said modem generates an internal clocking signal and includes at least one control register for storing control information that instructs said modem to perform various functions, and a second circuit arrangement which repetitively commands said first circuit arrangement to utilize said common clocking signal in producing said substantially simultaneous signal transmission, wherein said second circuit arrangement repetitively rewrites said control register with control information instructing said modem to use said common clocking signal instead of said internal clocking signal.

2. A system as in claim 1 wherein said second circuit arrangement rewrites said control register at regularly repeated periodic intervals.

3. A system as in claim 1 wherein said rewriting of said command occurs at least once every thirty seconds.

4. A system as in claim 1 wherein said common clocking signal is distributed to each of said plural transmitters from a central control point via separate modem channels.

5. In a simulcast radio frequency communications system having plural spatially separated RF transmitters, said system providing a common clocking signal distributed to each of said plural transmitters so as to facilitate substantially simultaneous signal transmission by said plural transmitters, wherein each RF transmitter includes a transmitter modem that is substantially in synchronization with a control point modem and wherein said transmitter modem is responsive to command signals for determining a clocking signal source and is configured to operate in a first mode utilizing said common clocking signal as an externally supplied clocking signal source and, upon the occurrence of a power failure condition, to operate in a second or default mode utilizing an internally generated clocking signal, a method for protecting against loss or disruption of modem synchronization due to momentary power disruptions or power fluctuations comprising the step of repetitively providing command signals continually to said transmitter modem instructing said transmitter modem to operate in said first mode utilizing said common clocking signal as a supplied clocking signal source.

6. In a simulcast radio frequency communications system having plural spatially separated RF transmitters all transmitting substantially the same signal at substantially the same radio frequency, said system providing a common clocking signal distributed to each of said plural transmitters so as to facilitate a substantially simultaneous signal transmission by said plural transmitters, each of said plural RF transmitters comprising:

a first circuit arrangement including a modem, said first circuit determining, at least in part, transmission timing for producing said substantially simultaneous signal transmission, and said modem generates an internal clocking signal and includes at least one control register for storing control information that instructs said modem to alternatively use either said internal clocking signal or said common clocking signal, and a second circuit arrangement which continually rewrites said modem control register with control information instructing said modem to utilize said common clocking signal.

7. In a radio frequency communications system having plural spatially separated RF transmitters all transmitting substantially the same signal at substantially the same radio frequency, said system providing a common clocking signal distributed to each of said plural transmitters so as to facilitate a substantially simultaneous signal transmission by said plural transmitters, each of said plural RF transmitters including:

a first circuit arrangement, which determines, at least in part, transmission timing for producing said substantially simultaneous signal transmission, said first circuit arrangement including a modem having a means for selecting between an internally generated clocking signal or an externally supplied clocking signal, and a second circuit arrangement which repetitively commands said first circuit arrangement to utilize said common clocking signal in producing said substantially simultaneous signal transmission, said second circuit arrangement comprising a means for repetitively instructing the modem to select said externally supplied clocking signal, wherein said common clocking signal is provided as said externally supplied clocking signal.

8. In a simulcast radio frequency communications system having plural spatially separated RF transmitters transmitting substantially the same radio signal at substantially the same radio frequency, said system providing a common clocking signal to each of said plural transmitters, each of said plural RF transmitters including:

a modem which determines, at least in part, transmission timing for transmitting said radio signal, said modem having an internal clocking signal source and includes at least one control register providing control information that selects between said internal clocking signal source and an external clocking signal input, said common clocking signal being connected to said modem external clocking signal input, and a circuit arrangement connected to said modem which repetitively rewrites said modem control register with control information to select said external clocking signal input instead of said internal clocking signal source.

9. A system as in claim 8 wherein said circuit arrangement rewrites said control register at regularly repeated periodic intervals.

10. A system as in claim 8 wherein said circuit arrangement rewrites said control register at least once every thirty seconds.

11. In a simulcast radio frequency communications system having at least two RF transmitters transmitting substantially the same radio signal at substantially the same radio frequency, each of said RF transmitters having an associated modem, a method of synchronizing said transmitted radio signals including:

(a) providing a common clocking signal to an external clocking signal input of the modem of each of said transmitters, (b) at each of said transmitters, storing at least one modem control bit that controls selection by said modem of said modem external clocking signal input; and (c) at each of said transmitters, repetitively writing said stored modem control bit to ensure the modem continues to select the external clocking signal input.

\* \* \* \* \*